United States Patent [19]

Petersen

[11] Patent Number: 4,814,965
[45] Date of Patent: Mar. 21, 1989

[54] HIGH POWER FLYBACK, VARIABLE OUTPUT VOLTAGE, VARIABLE INPUT VOLTAGE, DECOUPLED POWER SUPPLY

[75] Inventor: Alan Petersen, Cupertino, Calif.
[73] Assignee: Spectra Physics, San Jose, Calif.
[21] Appl. No.: 103,558
[22] Filed: Sep. 30, 1987
[51] Int. Cl.$^4$ .................. H02M 7/00; H02M 3/335
[52] U.S. Cl. .................. 363/65; 363/21; 363/39
[58] Field of Search .................. 363/20, 21, 39–40, 363/44–48, 65, 95, 97, 131; 323/271, 272

[56] References Cited

U.S. PATENT DOCUMENTS

| | | | |
|---|---|---|---|
| 4,195,333 | 3/1980 | Hedel | 363/21 |
| 4,290,101 | 9/1981 | Hergenhan | 363/21 |
| 4,507,721 | 3/1985 | Yamano et al. | 363/21 |
| 4,513,361 | 4/1985 | Rensink | 363/21 |
| 4,618,919 | 10/1986 | Martin, Jr. | 363/21 |

OTHER PUBLICATIONS

"Switching Power Supplies-Novel Circuit Approaches, Space Applications and Characteristic Measurements", WESCON/77, San Francisco, Sep. 19–21, pp. 6–8.
Transistors-Diodes, Copyright by General Electric Company, U.S.A. by Allen et al. pp. 4 and 97.

Primary Examiner—Peter S. Wong
Attorney, Agent, or Firm—Ron Fish

[57] ABSTRACT

There is disclosed herein a modular, high power, flyback transformer based power supply with step up and step down capability. The power supply uses multiple flyback transformers having switching transistors which may be either connected to one terminal of the primary winding or which may be placed in the center of the primary winding. The switching transistors are driven by pulse trains which are out of phase with each other. This results in lowered RMS values for ripple current through the input and output capacitors. The flyback voltage transients may be used to step up or step down the input voltage by varying the pulse width of the pulse in the switching pulse trains. In embodiments where the switching transistors are placed in the middle of the primary windings, better suppression of radio frequency emissions and current in safety ground wires is achieved. There is also disclosed a combination of such power supply modules in series or parallel on either the input or output to deliver higher power or higher output voltage or to be able to handle higher levels of D.C. input voltage. There is also disclosed an improved an improved flyback transformer design having substantially lower leakage inductance using coaxial cable as the wire from which the primary and secondary windings are made.

14 Claims, 7 Drawing Sheets

HIGH POWER FLYBACK, VARIABLE OUTPUT VOLTAGE, VARIABLE INPUT VOLTAGE, DECOUPLED POWER SUPPLY

BACKGROUND OF THE INVENTION

The invention pertains to the field of variable output voltage power supplies with the capability to step up or step down the output voltage relative to the input voltage. More particularly, the invention pertains to the field of flyback power supplies with high output power capability.

In power supply design certain characteristics are very desirable. Among these characteristics are low cost, low noise on the output voltage, a variable output voltage which can be stepped up or stepped down relative to the input voltage, and the ability to have any output voltage within the designed range of output voltages for any input voltage within a designed range of input voltages which cover the world's power line standard voltages. Further, in many applications such as laser power supplies, it is very important to have low audible noise generated by the power supply. For example, in doctors, offices, lasers are frequently used to do operations on the eye. If the power supply switching regulator switches at a frequency within the typical ability of most people to hear, e.g., 16,000 Hz, and this switching frequency is imposed upon the D.C. output as ripple current, audible noise will be heard when the laser is running. Further, for laser power supplies, any noise which appears on the D.C. output will also appear in the light intensity at the output of the laser. For many applications this is highly undesirable.

Also in laser power supplies for plasma tubes used in certain types of lasers, higher levels of power output from the laser require more voltage to drive the plasma tube. Frequently, the changes in power of the laser must be made rapidly. Therefore it is desirable to have a power supply whose output voltage can be raised quickly to a voltage higher than the input line voltage and which can be varied rapidly either above or below the input line voltage.

Since there are many different applications for power supplies in the world, it is desirable to have a power supply with a modular design such that power supply modules may be ganged together in parallel or series to provide higher output powers or higher output voltages. Further, it is desirable to be able to gang the modular power supplies together in series at their inputs so that higher levels of input voltage from the power lines in certain countries may be used without the need to use a different power supply. Such a modular design allows the same module to be used in many different applications thereby allowing the annual production level for the module design to be higher. Economies of scale then allow the modules to be built more cheaply.

Finally, in some countries of the world such as the United States, there are strict standards for maximum levels of radiated emissions and for the levels of current flowing in safety ground wires for the three-wire safety ground outlets which are now required by law for many applications. Therefore, it is useful to have a modular power supply design which can meet these safety and emissions standards.

SUMMARY OF THE INVENTION

According to the teachings of the invention, there is taught a high power, flyback transformer based, power supply which provides a variable direct current (hereafter D.C.) output voltage which may be either higher or lower than the voltage of the alternating current (hereafter A.C.) voltage at the input. According to one embodiment of the invention, multiple flyback transformers are used. Each said transformer has a primary winding and a secondary winding. A rectified D.C. input voltage is applied across a single, shared input capacitor. One terminal of each of the primary windings is coupled to the positive voltage node of the input capacitor. The other terminal of each terminal winding is coupled to ground through a switching transistor. In the preferred embodiment, four transformer/switching transistor combinations are used. Each transistor is driven by a pulse train of switching pulses which turn the transistor on and off. Each of the pulses in this pulse train may be varied such that the duty cycle of each pulse train in terms of pulse on-time versus pulse off-time may be varied. Each pulse train is out of phase with each other pulse train in the preferred embodiment. In this embodiment, the first flyback transformer/switching transistor combination is coupled to a reference pulse train which will be defined as having zero phase. The second switching transistor is coupled to a second pulse train which has a phase which is 90° different than the first pulse train. The third switching transistor is coupled to a third pulse train which is 18° out of phase with respect to the reference pulse train. The fourth switching transistor is coupled to a fourth pulse train which is 270° out of phase with the reference pulse train.

The secondary winding of each flyback transformer is coupled through a diode to a summing junction and a single, shared output capacitor. As each transistor is turned on and turned off in the primary winding circuit, energy is stored in the magnetic field of the primary winding. When the corresponding switching transistor turns off, the inductance of the primary winding tries to keep the current flowing through the primary winding in the same direction and at the same magnitude. What results is a voltage transient which builds up across the primary winding as the magnetic field collapses and the magnetic flux lines cross the turns of the primary winding. This voltage transient would rise toward positive infinity at the collector of the switching transistor if it were not clamped by the action of the diode in the secondary circuit. However these voltage transients in the primary are clamped at a voltage equal to the input voltage plus the output voltage. When this voltage is reached, the diode conducts and energy stored in the collapsing primary winding magnetic field is drained and stored in the shared output capacitor.

The summing junction is coupled to an output terminal at which appears the D.C. output voltage provided by the power supply. The output terminal has connected to it the output capacitor for filtering ripple current at the output terminal to ground. This output capacitor has the characteristic of tending to resist voltage changes on the output node.

In summary, energy transfer occurs as follows. As each voltage transient occurs in the primary winding resulting from a current pulse, the voltage transient in the primary winding rises to a point where the secondary winding by inductive coupling drives the anode of the corresponding diode in the secondary circuit to a voltage which is more positive than the voltage at the cathode coupled to the output node. Since the cathode is coupled to the summing junction which is the output node, the cathode resides at the output voltage level. The polarity of the primary and secondary windings of each transformer is such that when the switching transistor tries to shut off current flow through the primary winding, the anode of the diode in the secondary circuit is driven positive. When the anode of each diode is driven to a voltage which is higher than the output voltage, the diode becomes forward biased and starts to conduct. This tends to drain the energy out of the primary circuit and conduct it to the output node to which a load is connected.

Because all the transistors are driven out of phase relative to each other, the resulting voltage transients in the secondary circuits will be also out of phase and temporally "interdigitated". This would cause ripples on the output voltage node if it were not for the filtering action of the output capacitor. The output capacitor tends to resist changes in voltage across it as all capacitors do. This characteristic tends to smooth out the ripples such that a noise-free or substantially noiseless D.C. output voltage is provided.

An improvement to minimize radiated emissions at the output is to couple the load to the D.C. output voltage through a standard radio frequency interference filter having differential mode and common mode rejection ratios.

Another significant improvement in the power supply design to reduce radiated radio frequency interference and excessive current in the safety ground is to place the switching transistors in the middle of the primary winding and to place the diodes in the middle of the secondary windings. That is, each primary winding is divided into two halves. At the center turn of the winding, the collector of the switching transistor is connected to one half of the center turn and the emitter of the switching transistor is coupled to the other half of the center turn. The remaining terminals of the primary winding are then coupled to the D.C. input voltage and to ground, respectively. This improvement has the effect of generating canceling noise spikes at the moment that each switching transistor attempts to cut off current flow through the corresponding primary winding. That is, when each transistor cuts off current flow, the collector of the switching transistor experiences a voltage transient spike which moves toward positive infinity in order to the transistor. Simultaneously, the emitter terminal of each switching transistor experiences a negative-going voltage transient with a voltage moving toward negative infinity in an attempt to keep current flowing through the switching transistor at the same magnitude and in the same direction as it was flowing prior to the transistor cutoff. These positive and negative going spikes are inductively and capacitatively coupled to other conductors in the circuit such as the input voltage line, the output voltage line and the safety ground wire. This occurs because both transients are very narrow, very high voltage spikes. These spikes tend to splatter the radio frequency band with fourier harmonics which are radiated and which are picked up by other wires in the circuit. However, since both positive- and negative-going spikes are generated, the two spikes cancel each other out, thereby substantially reducing radiated noise and excessive current in the safety ground wire. The same improvement can be made on each secondary winding by placing the diodes in the middle of the secondary windings.

DETAILED DESCRIPTION OF THE PREFERRED AND OTHER EMBODIMENTS

Figure 1:
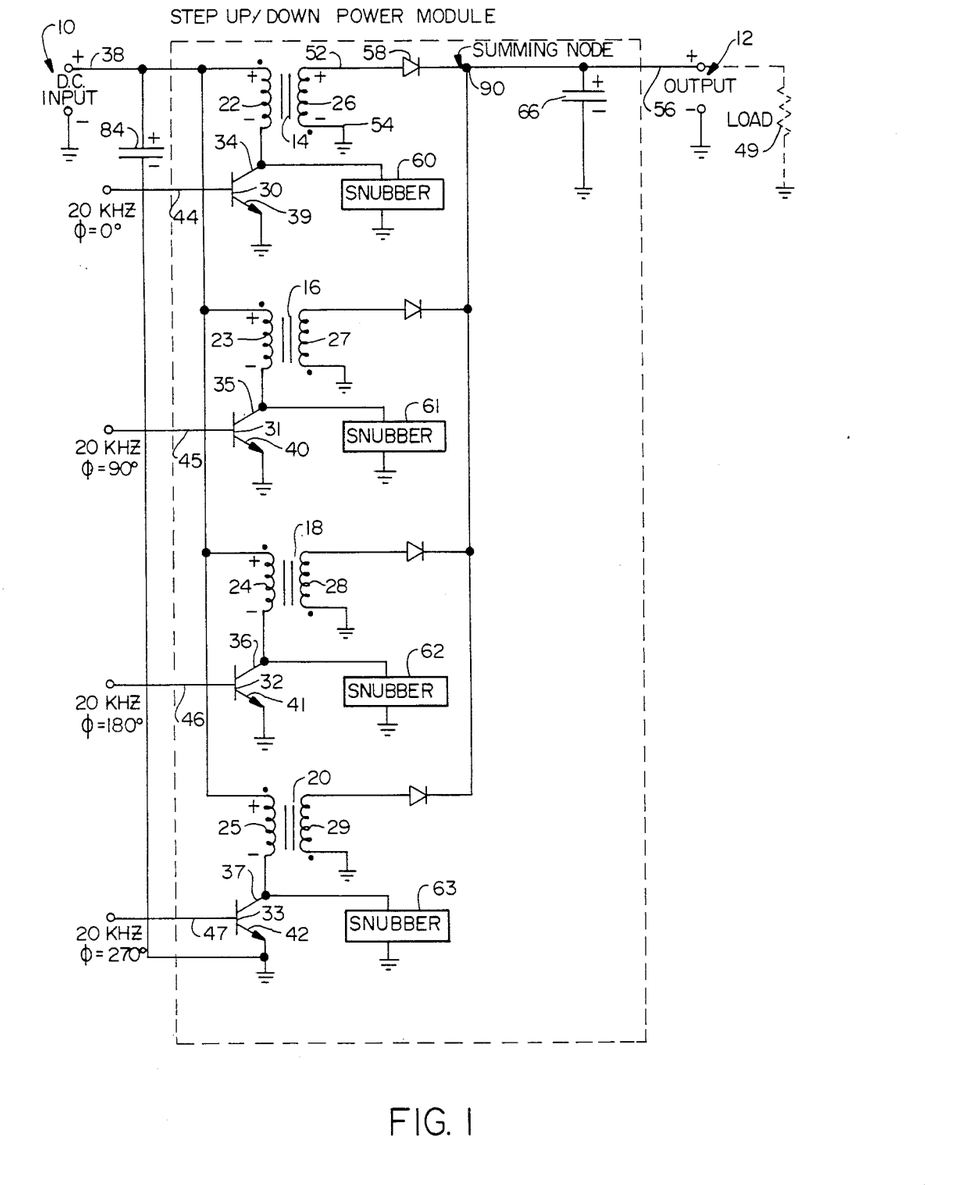
FIG. 1 is a schematic diagram of one embodiment of a step up/down power module for taking any D.C. input within a particular range and converting it to any D.C. output within a particular range which is useful in certain countries without strict emissions and safety wire current standards as are found in the U.S.

Referring to FIG. 1 there is shown a schematic diagram of one embodiment of the step up/down power module according to the teachings of the invention for use in countries which do not have the same strict restrictions on radio frequency emissions and safety wire ground maximum current flow as are found in the United States. The purpose of this power module is to accept a D.C. input voltage at the input terminal 10 and to convert it to either a higher or a lower output D.C. voltage at an output terminal 12.

The three phase power which is commonly used to supply high power, high voltage power supplies varies in its voltage depending upon the country. For example, Canada has three phase power which is either 240 volts or 480 volts. The United States, on the other hand, has three phase power which is 208 volts or 480 volts. In Europe, the most common three phase power is 380 volts. It is useful to have a power supply which can handle any voltage within the range of voltages available throughout the world and which can deliver high power at any D.C. voltage level. Such a power supply can have many more applications than a power supply which only accepts one input voltage and which cannot step up the input voltage or which can deliver limited power. Thus the ability of the step up/down power module shown in FIG. 1 (or FIG. 3) to handle any input voltage and to step the input voltage either up or down and the ability of the power module to be ganged together is very useful. On the latter point, the power modules of either FIGS. 1 or 3 can be ganged together in parallel or series fashion so as to be able to deliver higher levels of power or deliver higher output voltages or to handle higher input voltages. A description of how the power modules may be ganged together in series or parallel is given below.

The step up or step down capability of the power module is achieved by using the flyback transformer principle. Heretofore in the prior art, flyback transformer-based power supplies have been known. However, those skilled in the art generally regarded flyback transformer power supplies to be unsuitable for high power applications. The reason for this was that flyback transformers work on the principle of high voltage transients in inductors which result when current flow through the inductor is interrupted. Flyback transformer power supplies utilize these transients by using switching transistors which are switched at high frequencies to interrupt current flow through the primary coil of the flyback transformer. The resulting voltage transients can be used to generate any voltage level on the output, but they also cause ripple current in both an input capacitor and an output capacitor which are conventionally used to smooth out voltage fluctuations at either the input or the output. When a flyback transformer power supply is used for high power applications, it is impossible to find capacitors which have sufficient ripple current capacity to be used without damage. This problem has heretofore limited use of flyback transformer based power supplies to low power applications.

The concept of ripple current and its effect on input and output capacitors will be explained in more detail below. For now, it should be understood that ripple current is the result of the chopping action by the switching transistors, and appears to the capacitors as A.C. current flowing therethrough. This A.C. current has an RMS current value which is passed through the parasitic internal resistance of the non-ideal capacitors found in the real world. If the RMS value is sufficiently high and the capacitor internal resistance is sufficiently high, severe damage and even destruction of the capacitor will result.

This limitation has been overcome in the system of the invention. According to the teachings of the invention, the high ripple current levels have been reduced by using multiple flyback transformers being driven by switching transistors operating at high frequencies with switching pulse trains which are out of phase with each other. Further, new high ripple current capacity capacitors have been used.

A further limitation to use of conventional flyback transformer based power supplies in the prior art was the expense of the switching transistors which were necessary to handle the high primary winding current loads. New, cheaper high power transistors used in locomotives have been selected for use in the system of the invention. These low cost, high power transistors make a high power, flyback transformer-based power supply more economically feasible to build.

In the embodiment of FIG. 1 the voltage transients in the primary windings are harnessed using four flyback transformers, 14, 16, 18, and 20. These flyback transformers have primary windings 22-25, respectively. These flyback transformers also have secondary windings 26-29, respectively, which are inductively coupled to the primary windings.

Switching transistors 30-33 are used to interrupt current flow through the primary windings 22-25 of the flyback transformers. Each of these switching transistors has a collector 34-37, respectively, which is coupled to the negative terminal of the corresponding primary winding (a positive D.C. voltage with respect to ground potential is assumed at the positive node 38 of the input terminal 10). Each of the positive terminals of the primary windings 22-25 is coupled to the positive terminal 38 of the D.C. input 10. Each of the switching transistors 30-33 has an emitter terminal 39-42, respectively, which is grounded. Each of the switching transistors also has a base terminal 44-47, respectively, which receives a pulse train of switching control pulses. These switching control pulses are generated by a regulator circuit (not shown) of conventional design which will be discussed in more detail later. Each of the switching control pulse trains is out of phase with each of the other switching control pulse trains in the embodiment shown in FIG. 1. For a designed 6 kilowatt output power and an input voltage of approximately 230-350 V.D.C. for the power module shown in FIG. 1, the switching transistors 30-33 should have the characteristics of the transistors manufactured by Fuji under model no. EV1277.

The step up/step down capability of the power module of FIG. 1 is controlled by varying the duty cycle of the switching pulse trains received at the base terminals 44-47 of the switching transistors 30-33. The duty cycle of the switching pulse trains is the percentage of the time that the switching pulses have the switching transistors 30-33 turned on versus the percentage of the time when the switching transistors are turned off. The duty cycle is controlled by the voltage regulating mechanism (not shown) in a conventional manner. Several integrated circuit companies such as Motorola, Silicon General, and Unitrode make commercially available integrated circuits which can perform a voltage and current regulating function. Typically these integrated circuits are coupled to two sensors at the output terminal 12, one of which senses the voltage at the output and one of which senses the load current flowing through a load 49 coupled to the output. These signals are compared to user inputs regarding either the desired voltage or the desired current. The results of the comparison are then used to control the duty cycle of the base drive pulse trains. These integrated circuits can do either a voltage mode control or a current mode control. In the voltage mode, the voltage at the output terminal 12 is regulated to a desired voltage set by user input. In the current mode control, the current flowing through the load is regulated in accordance with the user input, but when the voltage rises to a predetermined level across the load, the regulator switches over to voltage mode control and regulates the duty cycle to control the voltage across the load to be no more than a given maximum.

Figure 2A:
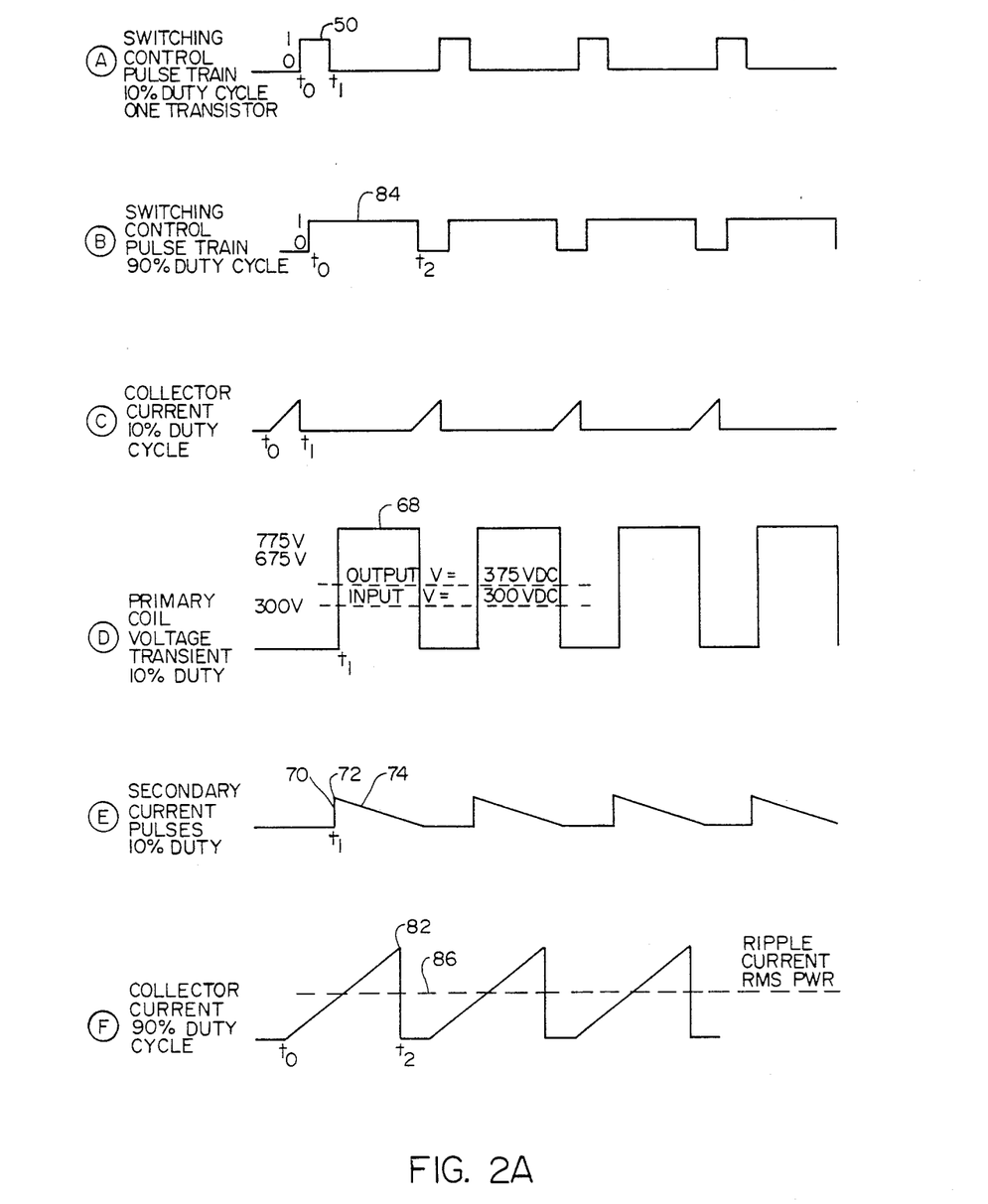
FIGS. 2A and 2B are a timing diagram showing the timing relationships and pulse shapes for various voltage and current pulses in the embodiment shown in FIG. 1.
Figure 2B:
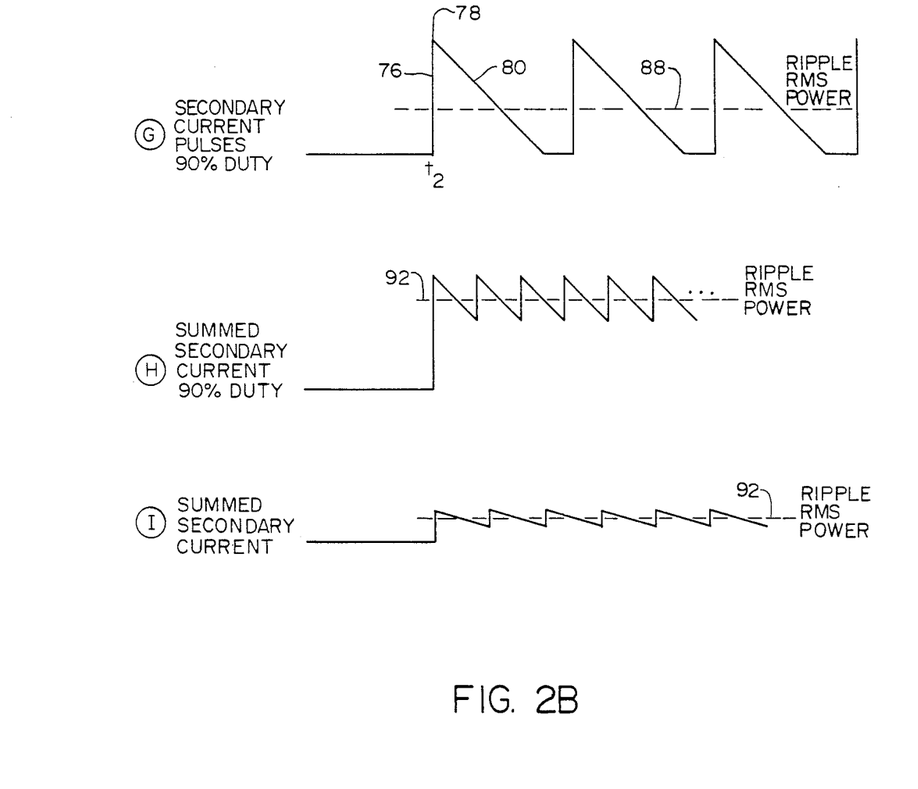

FIGS. 2A and 2B are a timing diagram which shows the shapes of the base drive switching control pulses in the switching control pulse train for a single switching transistor and the resulting current pulse which results through the primary winding as a result of the switching transistor having been turned on. FIGS. 2A and 2B also shows the resulting voltage transient across the primary winding which results when the current through a primary winding is interrupted. FIGS. 2A and 2B also show the shapes of the secondary current pulses which result from the primary current pulses for both a single flyback transformer embodiment and for an embodiment of four flyback transformers and the summed result at the output for the circuits shown in FIGS. 1 and 3.

In FIG. 2A, lines A and B show the switching control pulse trains for a single transistor for a 10% duty cycle and 90% duty cycle, respectively. As seen from line B, for a 90% duty cycle, the single switching transistor is on 90% of the time, as represented by the logic 1 level, and is off 10% of the time, as represented by the logic 0 level. The resulting primary current pulse in the primary winding of the single flyback transformer associated with the switching transistor driven by the pulse train of line A is shown at line C. As seen at line C, the current in the primary winding begins to rise linearly at time $t_0$ where $t_0$ is the turn-on time of the switching transistor controlled by the pulse train of line A. At time $t_1$, the pulse 50 on line A terminates. This results in the corresponding switching transistor being turned off.

To illustrate the effect of the termination of base drive at time $t_1$ on line A, assume that the switching transistor being driven by the pulse train of line A is transistor 30 in FIG. 1. When transistor 30 attempts to stop current flow from the positive terminal of the primary winding 22 to ground through the emitter terminal 39, a large voltage spike occurs because of the characteristics of all inductors. That is, when one attempts to cut off current flow through an inductor, the magnetic field caused by the current flow starts to collapse. As the field collapses and the magnetic flux lines cut across the turns of the inductor, a large "back emf" is generated. This back emf (voltage) will rise toward infinity if it is not clamped. This voltage spike has a polarity which tends to force the current flowing through the inductor to continue to flow at the same current level and in the same direction as the current was flowing before primary current was interrupted. In FIG. 1 this back emf has the effect of pushing the collector terminal 34 of transistor 30 (assume the switching pulse waveform of FIG. 2A line A is driving transistor 30) toward positive infinity at time $t_1$. This transient attempts to keep current flowing through the primary winding 22 in the direction from the positive to the negative terminal toward the emitter terminal 39 and ground.

Because the primary winding 22 is inductively coupled to the secondary winding 26, the collapsing magnetic field flux from the primary winding also cuts the turns of the secondary winding 26 and generates a voltage across this winding. The orientation of the secondary winding relative to the primary winding 22 is such that when a positive potential appears between collector 34 and collector node 38, a positive potential also appears from node 52 to node 54 (ground) of the secondary winding 26. This of course is only true when the magnetic flux generated by the primary winding 22 is changing, such as when it is driven by alternating current or when the magnetic field is building up or collapsing.

The back emf which results on terminal 34 is illustrated on line D of FIG. 2A. Assuming in the hypothetical situation being considered that the D.C. input voltage from node 38 to ground is 300 volts D.C. and the output voltage from node 56 to ground is 375 volts D.C., the back emf across the primary winding 22 will rise to a level of about 775 volts and will be clamped there. The reason for this is because of the action of the diode 58. This will be explained in more detail below.

Despite the fact that the transistor 30 transitions to a high impedance level between the collector 34 and the emitter 39 at the time $t_1$, the positive voltage at the collector 34 rising toward positive infinity would tend to drive the same level of current through the transistor that was passing through it before the transistor turned off. This would destroy the transistor were it not for a snubber circuit 60. Each of the switching transistors 30-33 has an associated snubber circuit 60-63, respectively, connected across the transistor from collector to ground. The design of the snubber circuits 60-63 is conventional, and they serve the conventional purpose of protecting the transistors at turn-off time. This function is implemented by conduction of the primary current to ground through the snubber at turn-off time until such a time as energy transfer into the secondary winding occurs.

This energy transfer into the secondary winding occurs when the voltage on the node 52 rises to a level equal to the output voltage on node 56 plus one forward biased diode voltage drop. In order for node 52 to rise to this level, node 34 must rise to a level of the input voltage on node 38 relative to ground plus the output voltage on node 56 relative to ground plus one diode voltage drop. The reason for this is that as node 34 rises to +300 volts, the voltage across the primary winding 22 is 0. As the voltage n node 34 rises another 375 volts, node 34 will be positive by 375 volts with respect to node 38. Because of the reverse polarity orientation of the primary winding 22 and the secondary winding 26, node 52 will then be positive by 375 volts with respect to ground or node 54. As node 34 voltage rises further, the diode 58 will begin to conduct thereby allowing energy transfer from the primary winding magnetic field into the secondary winding circuit. This energy will be coupled to the output node 56 and will manifest itself as load current and voltage across the load. This voltage will charge up the output capacitor 66 if it is not already charged or change its voltage if the output voltage and the voltage cross the capacitor are not the same.

In reality, there is some overshoot of the voltage at node 34 before the clamping action takes place. This overshoot results from leakage inductance which is not coupled to the secondary winding, and has been found experimentally to be about 100 volts. It is for this reason that the primary coil voltage transient shown at line D at FIG. 2A shows the voltage at node 34 rising to 775 volts or 100 volts above the 675 volt total of the input voltage plus the output voltage. The horizontal portion 68 of this waveform shows the clamping action of the diode for the voltage transient. It is during this portion of the voltage transient that energy is being transferred from the primary to the secondary circuits. Of course those skilled in the art understand that the vertical transitions for all the pulses shown in FIGS. 2A and 2B are in fact not vertical but are sloped to have some realistic rise time or fall time. These slight distortions of the pulse shapes are of no consequence to understanding the invention.

The current pulses in the secondary resulting from the switching control pulse train shown at line A for 10% duty cycle are shown at line E. The first current pulse begins approximately at time $t_1$ when the switching control pulse 50 on line A shuts off the switching transistor 30. As the diode 58 turns on, the current rises sharply as shown at 70. The secondary current reaches a peak at 72 and then begins to decline linearly as shown at 74 as the primary winding energy is drained to he load. The current in the secondary drops to 0 when all the energy from the primary less any losses that might occur has been drained by the secondary circuit and coupled to the lode 49.

If the user desires more outward power to be delivered to the lode, the pulse width of the switching control pulse train is increased. Such a pulse train for a 90% duty cycle is shown at line B. In this pulse train, the switching transistor 30 is turned on at time $T_0$ and turned off at time $T_2$. The resulting primary coil voltage transient is not shown for this duty cycle, but the collector current resulting from the switching control pulse train from line B is shown at line F. As seen there, the collector current begins to rise linearly at time $T_0$ when the switching transistor 30 is turned on. This represents the time constant of the inductor and associated resistances as current builds up in the winding and the magnetic field is built. At time $T_2$ the switching control pulse attempts to turn off the transistor 30. At that time the collector current falls to 0 and the snubber 60 diverts current around the transistor 30 to ground as the voltage at node 34 rises toward positive infinity. When the voltage on the node 34 reaches approximately 775 volts, the voltage on node 52 rises to a level to forward bias the diode 58. Current then begins to flow in the secondary as shown at 76 on line G. The secondary current reaches a peak at 78 which is substantially higher than the peak current at 72 on line E. The difference in this peak current results from the higher level of energy stored in the primary winding magnetic field by virtue of the higher peak collector current shown at 82 on line F. This higher peak collector current is reached because the switching control pulse 84 on line B has a longer duration than the switching control pulse 50 on line A. The energy stored in an inductor is equal to $$\tfrac{1}{2} I_P^2 L f = POWER \qquad (1)$$

where
$I_P^2$ = the peak current falling in the primary winding,
L = the inductance of the primary winding,
f = the switching frequency of the switching control pulse train.

Since the power stored in the primary winding is transferred to the load, the output power of the power module shown in FIG. 1 can be varied as the square of the peak current $I_P^2$ flowing in the primary winding. Therefore, the output power varies as the pulse width of the switching control pulse train varies.

If only a single switching transistor and single flyback transformer were used, ripple current through the input and output capacitors would be a serious problem at high power levels. The RMS power or heating value of the ripple current flowing through the input capacitor 84 in FIG. 1 is shown at 86 on line F of FIG. 2A at high output power levels, this RMS current flowing through the parasitic surge resistance of the input capacitor 84 would destroy it. The RMS power of the ripple current flowing through the output capacitor for a single transistor, single flyback transformer power supply is shown at 88 on line G of FIG. 2B. As in the case of the input capacitor 84, at high power levels, the ripple RMS power shown at 88 flowing through the parasitic surge resistance of the output capacitor 66 will destroy it.

This ripple current problem has in the past prevented workers in the art from using flyback transformers for high power supplies. The reason is that no capacitors were available which had the ripple current capacity to withstand the high RMS ripple current power experienced at high current levels. A significant portion of the teaching of the invention is to avoid this problem using multiple flyback transformers and multiple switching transistors which are driven out of phase with each other. For the embodiment shown in FIG. 1, where use of 4 flyback transformers allows four times the power output as the use of a single flyback transformer for the same pulse width of the switching control pulses. This means that the same output power as is delivered using the switching control pulse train of line B for a single flyback transformer embodiment may be delivered using a switching control pulse train with only one fourth the pulse width of the pulse 84 if a 4 flyback transformer circuit is used. Because only one fourth the pulse width is used, the collector current does not rise to as high a peak value as shown at 82 on line F of FIG. 2A. Because the peak values are lower, and because the switching transistors 30-33 are driven out of phase with each other, the RMS level of the ripple current flowing through the input capacitor 84 is substantially lower in the embodiment of FIG. 1 than for prior art embodiments using a single flyback transformer and a single switching transistor.

Likewise, the ripple current RMS value flowing through the output capacitor 66 will be substantially lower using four flyback transformers and four switching transistors which are driven out of phase with each other than for a single flyback transformer/switching transistor combination delivering the same output power. This is illustrated graphically on lines H and I of FIG. 2B. Line H shows the secondary current for the four flyback transformer embodiment using the 90% duty cycle switching control pulse train of line B for each switching transistor and driving each switching transistor out of phase with each of the other switching transistors. Each flyback transformer secondary then experiences a secondary current pulse train as shown at line G, but each such pulse train is 90° out of phase with its neighbors. When these four individual secondary pulse trains are summed at the summing node 90, the resultant secondary current wave form is as shown on line H. The resultant RMS ripple current level is as shown at 92. Note that this is a substantially higher level than the ripple current RMS level at 88 on line G. This reflects the fact that four times as much power is being delivered to the lode 49 in the four transformer embodiment as was delivered in the one transformer embodiment if both are driven by the same switching control pulse train. Shortening of the switching control pulse train pulse width so as to deliver the same output power as shown on line G results in a summed secondary current wave form as shown at line I. The RMS ripple current level for this wave form is as shown at 92. The resultant output power delivered by the wave form shown at line I is the same as delivered by the secondary current pulse train shown at line G, but the RMS level of the ripple current at 92 is substantially lower than at 88.

Figure 3:
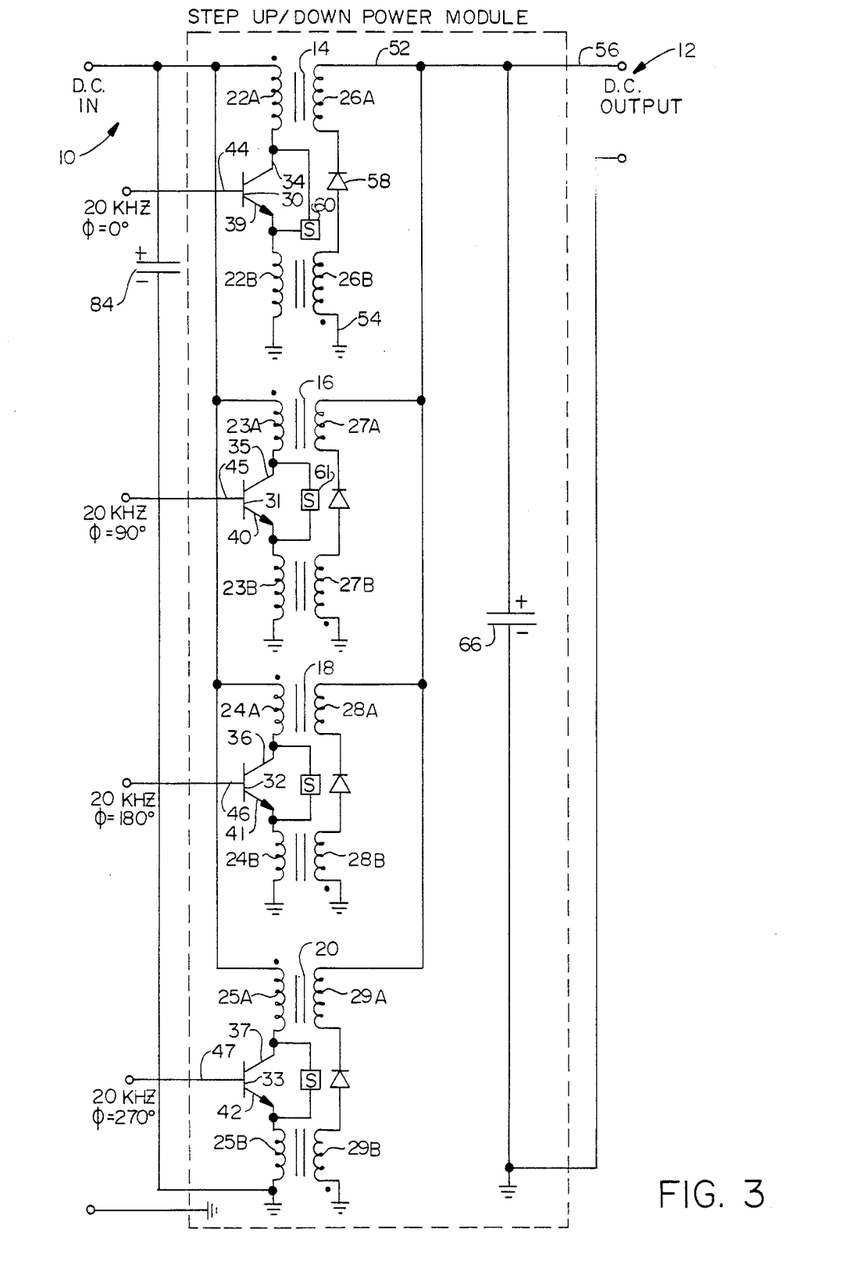
FIG. 3 is a schematic diagram of the preferred embodiment of the step up/step down power module for applications within the United States.

The embodiment of FIG. 1 is useful for countries where radio frequency emissions are not controlled by regulation. In some countries, such as the United States, the Federal Communications Commission has published standards on the permissible levels of radio frequency emissions for all electronic circuits. The reason that the embodiment of FIG. 1 is not preferred for applications in countries having such radio frequency emission controls is that the high power, high voltage transient spikes caused by the interruption of current flow through the primary windings have many high frequency fourier components which are radiated from the circuit. Further, many countries have certain safety standards regarding the amount of current which may flow in the safety ground of 3 wire plugs through which electronic circuits are connected to the power lines. The safety wire is the familiar third, round prong on many power tools. In the United States, the Underwriter's Laboratories the maximum permissible level of current flow in the safety ground wire for medical equipment is on the order of 500 microamperes. The voltage spikes mentioned above also result in capacitive coupling to the safety ground wire, and will result in a ground wire current of about 4 milliamperes for a single flyback transformer circuit. Since this level is too high, some mechanism for eliminating this safety ground current and the radio frequency emissions must be used for embodiments to be employed in the United States. In FIG. 3, elements which are numbered with the same reference numerals as corresponding elements in FIG. 1 perform the same function. The principal difference between FIG. 2 and FIG. 1 is that the switching transistors are placed in the middle of the primary windings and the diodes are placed in the middle of secondary windings. That is, each of the primary windings is divided into two halves and the center turn is broken and brought out from the transformer. One end of the broken center turn is coupled to the collector of the corresponding switching transistor and the other end of the broken center turn is coupled to the emitter of the switching transistor. This has the effect of putting the collector to emitter path of each transistor in series with the primary winding such that current flowing through the primary winding must flow through the switching transistor to get from one half of the winding to the other half of the winding. A similar situation exists for the diodes in the secondary windings. Each secondary winding turn is broken and brought outside the transformer. One end is connected to the cathode of the diode and the other end is connected to the anode of the diode. This forces current in the secondary winding to pass through the diode in order to get from one half of the secondary winding to the other half. The purpose of placing the switching transistors and diodes in the middle of the corresponding windings of the flyback transformer is to generate canceling positive and negative voltage transients. These canceling transients substantially reduce or eliminate the radio frequency emissions emanating from the circuit, and substantially reduce the amount of current in the safety ground wire which is picked up by that wire by inductive coupling.

The canceling voltage transients are generated each time one of the switching transistors attempts to interrupt current flowing through the two halves of the primary winding of the corresponding flyback transformer. For example, consider switching transistor 30. When this transistor attempts to interrupt current flow through the two halves of the primary winding 22A and 22B, the collector node 34 will experience a voltage transient which rises toward positive infinity. The reason for this is to attempt to force current to flow at the same level and in the same direction as it was flowing prior to the interruption. Likewise, the emitter terminal 39 will experience a voltage transient which rises toward negative infinity. If the current flowing through the primary winding is visualized as a flow of positive charges in the direction from the collector node 34 to the emitter node 39, then the negative-going voltage transient at the emitter 39 tends to attract these positive charges out of the collector node 34 toward the emitter node 39 to attempt to keep current flowing in the same direction and at the same level. These equal and opposite voltage transients generate equal and opposite capacitive coupling of the transistor's equal collector to chassis stray capacitance and the emitter to chassis stray capacitance, thereby canceling the current flowing therein, causing no current to flow in the chassis safety ground wire, and they generate equal and opposite radio frequency emissions which cancel by virtue of being 180° out of phase with each other. The same reasoning applies to the placement of the diodes in the middle of the secondary windings, the diodes also having the same property of equal stray capacitance from anode to chassis, and cathode to chassis.

The embodiment of FIG. 3 otherwise works the same as the embodiment shown in FIG. 1 in that four separate switching transistor/flyback transformer combinations are used, and each switching transistor is driven by a pulse train which is out of phase with the pulse trains which control the switching of the other transistors.

Figure 4:
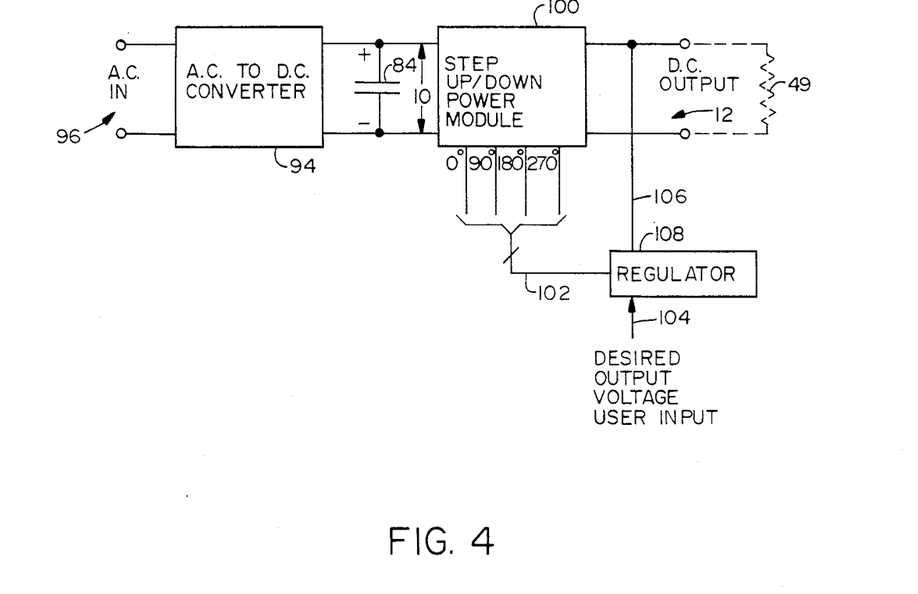
FIG. 4 is a block diagram of a power supply with one module according to the teachings of the invention.

Referring to FIG. 4 there is shown a system level block diagram of a typical power supply built using the step up/step down power module of either FIG. 1 or FIG. 3. In this system, an A.C. to D.C. converter module 94 accepts the A.C. power from the power line at an A.C. input terminal 96. This module is conventional in design and serves to rectify the alternating current input power at terminal 96 and to output a D.C. voltage at terminal 10. An input capacitor 84 helps filter out ripple current. A step up/step down power module 100 having a design like that shown either in FIG. 1 or FIG. 3 accepts the D.C. input signal at 10 and steps it up or down in voltage to the desired D.C. output voltage at terminal 12. The desired D.C. output level is established by the pulse width of the switching control pulses on the switching control bus 102. The desired output voltage is established by a user or by a computer via an input at line 104. The output voltage at terminal 12 is sensed via a line 106 by a regulator 108. The regulator 108 is conventional in design and is commercially available as noted above. The regulator compares the desired D.C. output voltage to the actual D.C. output voltage sensed on line 106. The actual sensing symbolized by line 106 is both voltage across the output terminal 12 and load current flowing in the load 49.

Figures 5A, 5B:
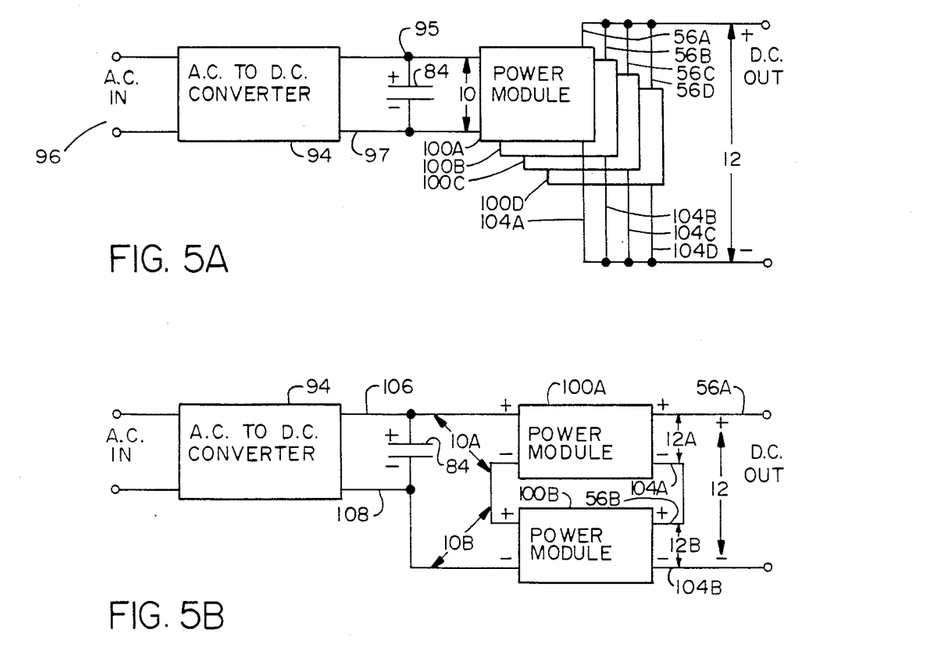
FIG. 5A is a block diagram of a power supply consisting of four modules coupled in parallel according to the teachings of the invention.
FIG. 5B is a block diagram of a power supply consisting of two modules having both their inputs and outputs coupled in series according to the teachings of the invention.
Figure 5C:
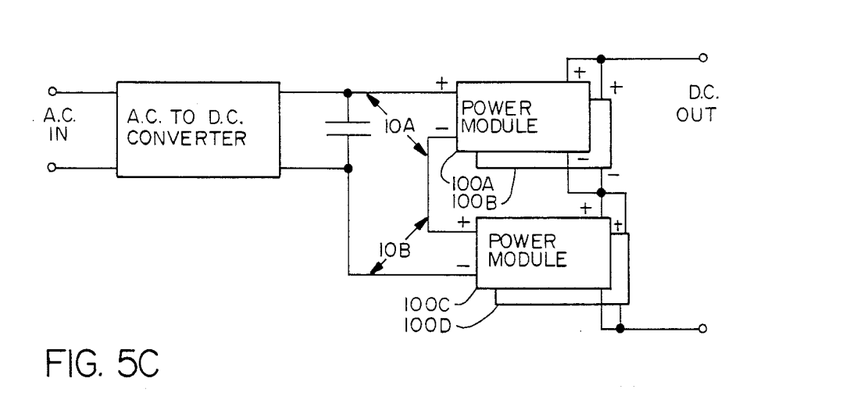
FIG. 5C is a block diagram of a power supply consisting of four modules divided into two pairs with the two pairs having their inputs coupled in series and each pair having their outputs coupled in parallel with the composite outputs of each pair coupled in series.

Referring to FIGS. 5A, 5B, and 5C, there are shown three different alternative arrangements for coupling of the power modules together to generate higher D.C. output voltages, or higher D.C. output powers, or to handle higher D.C. inputs.

FIG. 5A is a block diagram of a parallel power module configuration to deliver higher D.C. output power at the same D.C. output voltage as can be delivered by a single power module.

FIG. 5B is a series power module configuration to deliver higher D.C. output voltages than may be delivered by a single power module and to handle higher D.C. input voltages than may be handled by a single power module.

FIG. 5C is a series/parallel power module configuration to deliver twice the voltage and four times the power that may be delivered from a single power module and to handle twice the D.C. input voltage as may be handled by a single power module.

Referring first to FIG. 5A, the power supply system is similar to that shown in FIG. 4A except that the regulator 108 is not shown and except that four power modules 100A, 100B, 100C, and 100D are used instead of a single power module. In the embodiment of FIG. 5A, the power modules are connected in parallel to deliver four times the power at the same voltage that a single power module can supply. To do this, the input terminal 10 of each power module is connected to the positive and negative terminals of the input capacitor 84. Likewise, the positive D.C. output terminals 56A, 56B, 56C, and 56D are all connected to the positive node of the D.C. output terminal 12. Also, the negative terminals 104A, 104B, 104C, and 104D of the output capacitors for each power module are connected to the negative node of the D.C. output terminal 12. The switching control inputs of each power module are connected in parallel to the regulator (not shown). The regulator itself would be coupled as shown in FIG. 4. In the paragraph referring to the embodiment shown in FIG. 5B there is shown a series connection of the power modules so as to be able to handle twice the D.C. input voltage and so as to be able to supply twice the D.C. output voltage. In this embodiment, the D.C. inputs 10A and 10B of power modules 100A and 100B are coupled together in series. This means that the positive node of the D.C. input 10A is coupled to the positive node 106 of the input capacitor 84, and the negative node of the D.C. input 10B is coupled to the negative node 108 of the input capacitor 84. The negative node of the D.C. input 10A is coupled to the positive node of the D.C. node 10B. This allows the higher D.C. input voltages in some countries of the world such as the 480 volt 3 phase power found in the United States and Canada to be handled as easily as is the European 380 volt power or the U.S. 208 10 volt power. Even higher A.C. voltage inputs may be handled easily in this method by continuing to connect the D.C. inputs of multiple power modules in series. For example, if the maximum acceptable D.C. input voltage for a particular power module is 300 volts, and the output of the A.C. to D.C. converter 94 is 900 volts between terminals 106 and 108, then three power modules 100 may be connected in series such that each power module sees only 300 volts across its D.C. input 10. Likewise, if each power module is capable of outputting up to 600 volts from a 300 volt D.C. input, but 1200 volts D.C. is needed, then two power modules may have their D.C. outputs connected in series to deliver the desired output voltage. To do this, output terminal 56A of power module 100A is coupled to the positive node of the D.C. output terminal 12. The negative terminal 104A of power module 100A is then connected to the positive terminal 56B of power module 100B. Finally, the negative terminal 104B is coupled to the negative node of the D.C. output terminal 12.

FIG. 5C illustrates a series/parallel connection of four power modules to deliver twice the output voltage and four times the output power than may be delivered from a single power module. In this embodiment, power modules 100A and 100B are connected in parallel in the same fashion as shown in FIG. 5A. Likewise, power module 100C and 100D are connected in parallel. These two parallel combinations are then connected in series with each other in the same fashion as shown in FIG. 5B. The two D.C. inputs 10A and 10B are then connected in series as shown in FIG. 5B although they may be connected in parallel as shown in FIG. 5A.

Figure 6:
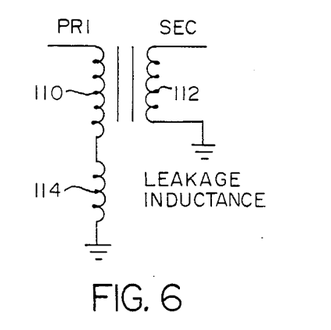
FIG. 6 is a schematic diagram of a typical transformer showing the leakage inductance.
Figure 7:
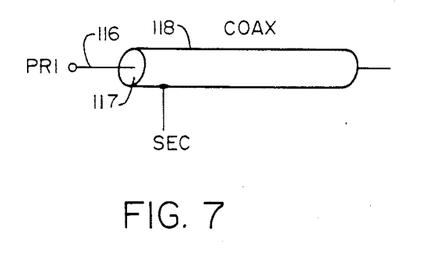
FIG. 7 is diagram of a typical section of coaxial cable.
Figure 8:
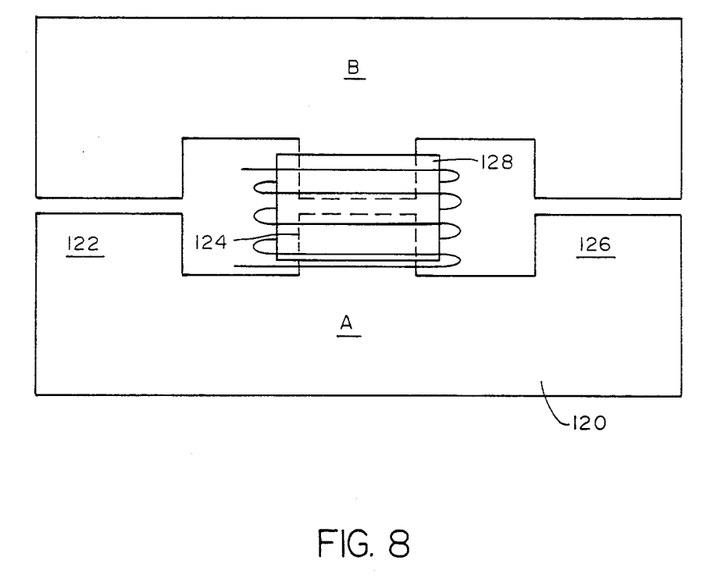
FIG. 8 is a diagram of a transformer design using coaxial cable according to the teachings of the invention.

Referring to FIGS. 6, 7 and 8, there are shown various aspects of the design of the flyback transformers used in each of the embodiments shown in FIGS. 1 and 3.

Referring first to FIG. 6, there is shown a schematic diagram of the actual equivalent circuit for a nonperfect transformer. In the transformer of FIG. 6, a primary winding 110 is inductively coupled to a secondary 112. However, there is a leakage inductance 114 which is not inductively coupled to the secondary winding 112. In conventional flyback transformer designs, this leakage inductance can be as much as 10% of the primary winding total inductance or as low as 2%. Because the leakage inductance is not inductively coupled to the secondary circuit, no clamping by the diode in the secondary circuit will limit the voltage transient appearing across the leakage inductance. This voltage transient can therefore rise to unrestrained levels and possibly damage circuit components such as the switching transistor. Accordingly, it is important to minimize the amount of leakage inductance in any way possible.

Fundamentally, the leakage inductance results from a lack of perfect coupling between the primary and secondary winding. In conventional flyback transformer designs, the primary winding was wound around one portion of a magnetic core while the secondary winding was wound around another portion of the same core. This results in a fairly high leakage inductance. Workers in the art were able to halve the leakage inductance by winding the primary and the secondary windings on the same bobbin and placing that bobbin on a projecting portion of a ferromagnetic core. This reduced the leakage inductance to approximately 5%. Other workers in the art have used bifilar wire to make the primary and secondary windings. Bifilar wire has two conductors within the same insulating jacket such that the two conductors lie side by side similar to a typical lamp cord. Essentially, bifilar wire is two insulated wires which are laid side by side and which have their insulation codings joined by a connecting web. This design reduced the leakage inductance to approximately 2%.

It has been discovered by the applicant that still further improvements can be made in the reduction of leakage inductance by using coaxial cable for the wire to make both the primary and the secondary windings. A section of coaxial cable is illustrated in FIG. 7. Coaxial cable essentially consists of a center conductor 116 which is surrounded by an insulating material shown at 117. The insulating material 117 and the center conductor 116 are then surrounded concentrically by a conductive shield 118. Typically the shield is a woven, copper conductor which is flexible and which is woven on the insulating material 117 by using the insulator as a form. The resultant structure is then coded with another layer of insulating material such as rubber.

FIG. 8 shows the preferred design for the flyback transformer used according to the teachings of the invention. In this flyback transformer design, an E core 120 is used. The E core is so named because it has three projecting portions: 122, 124, and 126. The E core is divided into two halves labeled A and B in FIG. 8. A central bobbin 128 of insulating material is used. This bobbin has a cylindrical configuration which has an inside diameter sufficient to fit snugly over the central projecting portion 124 of the E core. The primary and secondary winding is formed on this bobbin by taking a length of coax and winding it about the bobbin. The bobbin is then placed upon one of the projecting portions 124 and the mating half of the E core is then joined such that the projecting portion 124 of half A and the projecting portion 124 of half B are joined at the center of the bobbin. The center conductor 116 of the coax is then used as the primary winding and the outer shield 118 is used as the secondary winding. This reduces the leakage inductance to approximately 0.5%.

The leakage inductance also represents a power loss for power that must be snubbed to avoid destruction of the switching transistors. If 10% leakage inductance is present in a 36 kilowatt power supply, 3.6 kilowatts of power must be snubbed to preserve the switching transistors. This means the snubbers must be water cooled and must have a high current capacity. With the transformer design of FIG. 8, the snubbers can be air cooled and of much lower current capacity. The reason that the coaxial winding provides lower leakage inductance is because of the excellent capacitive coupling between the center conductor and the shield. That is, when the center conductor experiences a voltage transient moving toward positive infinity, the capacitive coupling moves the secondary toward positive infinity also.

The coaxial cable used for the winding is not critical, but it should have a breakdown voltage of at least 1,000 volts.

The very close capacitive coupling using coaxial cable also results in better cancellation of radio frequency noise and inductive current in the safety ground wire. Because of the close capacitive coupling, the shapes of the positive and negative going voltage transients which occur at each interruption of primary current have shapes which are very close to each other. The closer the match is between the shapes, the better is the cancellation of radio frequency noise and safety ground wire current.

Although the invention has been described in terms of the alternate and preferred embodiments disclosed herein, those skilled in the are will appreciate that other alternatives may be designed without departing from the true spirit and scope of the invention. All such alternatives are intended to be included within the scope of the claims appended hereto, such as using three transistors out of phase by 0°, 120°, 240°; or more than 4 transistors out of phase; or using other transformer core shapes than the "E", for example, the "U" shaped core with one split primary-secondary coaxial winding on each half of the legs of the "U".

What is claimed is:

1. An apparatus for generating a variable output voltage at an output from a variable input voltage comprising:
   a plurality of transformers, each having a primary winding and a secondary winding where coaxial cable is used for said windings with one conductor of said coaxial cable being used for said primary winding and one conductor of said coaxial cable being used for said secondary winding;
   means for receiving a variable amplitude direct current input voltage and for applying said input voltage to each of said primary windings as a train of current pulses having variable pulse width, each said pulse train being out of phase with the other pulse trains by a predetermined phase including means for generating said train of current pulses such that equal and opposite switching transient voltages are generated so as to minimize radio frequency interference; and
   means coupled between said output and each said secondary winding for coupling the stored energy in said primary windings to said output by summing the trains of current pulses flowing in said secondary windings and for smoothing ripples in the voltage at said output.

2. The apparatus of claim 1 wherein said means for generating said train of current pulses in said receiving means comprises a plurality of switching transistors having switching control terminals and coupled so as to control current flow through each said primary winding through the influence of duty cycle control signals applied to said switching control terminals and further comprising regulator means coupled to said output, to said switching control terminals and including means for setting the desired output voltage, said regulator means for sensing the output voltage at said output and for generating said duty cycle control signals so as to control the duty cycle "on" time of each switching transistor so as to attain and maintain the desired output voltage substantially regardless of the level of or fluctuations in said input voltage.

3. The apparatus of claim 2 wherein each said switching means is coupled to the middle turn of the corresponding primary winding such that the current which is being controlled by said switching means flows out of said middle turn, through said switching means and back into said middle turn.

4. The apparatus of claim 2 wherein said switching transistors are coupled to said primary windings so as to interrupt current flowing through said primary windings at the center point of each said winding, and wherein means for summing and for smoothing is comprised of an output capacitor coupled to said output to smooth out voltage fluctuations at said output, and further comprises a plurality of diode means coupling said secondary windings to said output capacitor for coupling the energy stored in each collapsing magnetic field of each said primary winding at turn off time of each said current pulse flowing therein to a summing junction coupled to said capacitor and to said output, said coupling occurring at a time that a voltage transient in the corresponding primary winding caused by the current pulse turnoff causes the voltage across the corresponding secondary winding to exceed the output voltage stored on said capacitor.

5. An apparatus of claim 4 wherein each said secondary winding is divided at a centertap point into first and second halves and wherein each said diode means couples said first and second halves together at said centertap point and wherein said output capacitor is coupled in parallel across each of said secondary windings.

6. An apparatus for generating at an output any D.C. output voltage within a predetermined range from an input signal at any input voltage within a predetermined range comprising:
   a plurality of primary windings each comprised of one conductor of a coaxial cable;
   means for repeatedly storing energy from said input signal in the magnetic field of each primary winding with the peaks of energy storage in each primary winding being out of phase with the peaks of energy storage in said other primary inductors;
   means for causing voltage transients in each said primary winding which rise toward infinity and for causing each voltage transient to be out of phase with each other voltage transient;
   means including a plurality of secondary windings, each secondary winding being inductively coupled to a corresponding one of said primary windings, each said secondary winding comprised of the other conductor of the coaxial cable comprising said corresponding primary winding for clamping the voltage transients in said corresponding primary winding at predetermined voltages related to the desired output voltage and for coupling the energy stored in said primary windings to said output and for smoothing out variation in the output voltage presented at said output.

7. The apparatus of claim 6 wherein said means for repeatedly storing energy and said means for causing voltage transients in each primary inductor include switching transistor means coupled in series with said primary inductors for interrupting and reestablishing current flow through said primary inductors periodically at the centerpoint of said primary inductor such that current flowing in each said primary winding must exit said primary winding at said centerpoint, pass through a corresponding one of said switching transistors and reenter said primary winding at said centerpoint so as to form a train of current pulses through each primary inductor and for causing each said train of current pulses to be out of phase with all the other trains of current pulses.

8. The apparatus of claim 6 wherein said output is a positive and a negative terminal and wherein said means for clamping, coupling and smoothing includes a metalized-polypropylene capacitor having a ripple current capacity sufficient to accommodate the ripple current at the power level provided at said output, said capacitor coupled across said output terminals, and further comprises a plurality of secondary inductors each having two end turns and one center turn, each inductively coupled to a corresponding one of said primary inductors and each having a diode coupled in series with said secondary inductor at the center turn so as to cause current flowing in said secondary inductor to flow out of said center turn, through said diode and back into said center turn, each said secondary inductor having its end turns coupled such that one end turn of each inductor is coupled to one terminal of said capacitor and the other end turn of each inductor is coupled to the other terminal of said capacitor.

9. A flyback transformers based switching regulator power supply for high power application with step up and step down variable output voltage relative to a variable input voltage comprising:
a plurality of transformers, each having primary and secondary windings, where each said transformer is comprised of a length of coaxial cable wrapped around a core and where said primary winding of each said transformer is comprised of one conductor of the corresponding length of coaxial cable, and wherein said secondary winding of each said transformer is the other conductor of the corresponding length of coaxial cable;
means for rectifying an A.C. input voltage which may be any one of a plurality of different voltage and for applying the resulting D.C. voltage to the primary windings of said transformers;
a plurality of switching means coupled to said primary windings for interrupting the flow of current through each said primary winding periodically with a variable duty cycle of on time versus off time for each said primary winding so as to generate a train of current pulses of variable pulse width in each said primary winding with each pulses train being out of phase with each other pulse train; and
means coupled to each said secondary winding for clamping at a predetermined voltage the voltage transients resulting in said secondary windings from inductive coupling of the voltage transients resulting in said primary winding from each said train of current pulses in the corresponding primary winding and for coupling the energy stored in the magnetic field of each said primary winding by each said current pulse to said output and for filtering out variations in voltage at said output.

10. The apparatus of claim 9 further comprising switching control means coupled to said output and to said switching means and including input terminal means for setting the desired D.C. output voltage, said switching control means for comparing the desired D.C. output voltage to the actual D.C. output voltage at said output and for generating control signals which are coupled to said switching means so as to vary said duty cycle in a way to achieve the desired D.C. output voltage.

11. A flyback transformer power supply wherein the improvement comprises:
a plurality of flyback transformers, each said flyback transformer comprising a primary winding and a secondary winding wrapped around one or more magnetically permeable cores, where said primary winding and secondary winding of each said transformer are comprised of the same length of coaxial cable, and where said primary winding is comprised of one conductor of said coaxial cable and wherein said secondary winding is comprised of the other conductor of said coaxial cable, and further comprising means for driving the primary windings thereof out of phase with each other, including switching means for interrupting current flow through said primary windings in accordance with a control signal and coupled to said primary windings so as to interrupt current flow through each said primary winding at the centerpoint thereof, and means for summing the output current pulses from the secondaries thereof.

12. The apparatus of claim 11 wherein said flyback transformer power supply supplies a power at an output of at least one kilowatt and includes an output capacitor means coupled to said output for reducing voltage variations at said output and having ripple current capacity sufficient to withstand heating caused by the RMS ripple current at the switching frequency.

13. The apparatus of claim 12 having the switching devices coupled to interrupt current at the center turn of the primary windings and having diodes coupled in series with the secondary winding center turn and interrupting the continuity thereof for predetermined bias conditions and the secondary windings in series with said output capacitor.

14. The apparatus of claim 13 further comprising an electromagnetic interference filter coupled to said output having means for filtering differential mode interference and common mode electromagnetic interference from the signal at said output.

* * * * *